United States Patent [19]
Deering

[11] Patent Number: 6,046,746
[45] Date of Patent: *Apr. 4, 2000

[54] METHOD AND APPARATUS IMPLEMENTING HIGH RESOLUTION RENDITION OF Z-BUFFERED PRIMITIVES

[75] Inventor: Michael F. Deering, Los Altos, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/673,117

[22] Filed: Jul. 1, 1996

[51] Int. Cl.[7] .................................................. G06F 17/10
[52] U.S. Cl. ............................................................ 345/422
[58] Field of Search ..................................... 345/139, 516, 345/424, 431, 429, 426, 419, 422, 505, 421, 503, 441, 502, 507, 420, 418, 423, 382, 285; 364/559, 746.1, 748, 715.04, 578, 715.03

[56] References Cited

U.S. PATENT DOCUMENTS

| | | | |
|---|---|---|---|
| 3,621,214 | 11/1971 | Romney et al. | 345/421 |
| 4,470,122 | 9/1984 | Sarr | 364/559 |
| 4,679,041 | 7/1987 | Fetter et al. | 345/139 |
| 4,800,515 | 1/1989 | Hori et al. | 364/746.1 |
| 4,985,834 | 1/1991 | Cline et al. | 345/424 |
| 4,991,131 | 2/1991 | Yeh et al. | 364/748 |
| 5,084,830 | 1/1992 | Doornink et al. | 345/516 |
| 5,103,418 | 4/1992 | Birger | 364/715.04 |
| 5,109,480 | 4/1992 | Sone et al. | 345/431 |
| 5,163,127 | 11/1992 | Ikumi et al. | 345/426 |
| 5,287,436 | 2/1994 | Fischer et al. | 345/419 |
| 5,293,467 | 3/1994 | Buchner et al. | 345/422 |
| 5,377,313 | 12/1994 | Scheibl | 345/422 |
| 5,392,393 | 2/1995 | Deering | 345/505 |
| 5,428,716 | 6/1995 | Brokenshire et al. | 345/421 |
| 5,438,527 | 8/1995 | Feldbaumer et al. | 364/578 |
| 5,440,682 | 8/1995 | Deering | 345/503 |
| 5,444,838 | 8/1995 | Kommrusch et al. | 345/441 |
| 5,457,779 | 10/1995 | Harrell | 345/502 |
| 5,499,324 | 3/1996 | Nakayama | 345/429 |
| 5,508,948 | 4/1996 | Hatta | 364/715.03 |
| 5,572,634 | 11/1996 | Duluk, Jr. | 345/419 |
| 5,596,686 | 1/1997 | Duluk, Jr. | 345/422 |
| 5,706,479 | 1/1998 | Winner et al. | 345/509 |
| 5,870,097 | 2/1999 | Snyder et al. | 345/426 |

FOREIGN PATENT DOCUMENTS

| | | |
|---|---|---|
| 06 656 609 | 6/1995 | European Pat. Off. . |
| 2219470 | 12/1989 | United Kingdom . |
| 2 271 259 | 4/1994 | United Kingdom ............ G06F 15/72 |

OTHER PUBLICATIONS

Foley, James D. and others, "Computer Graphics: Principles and Practice," 2d ed (Reading: Addison–Wesley) pp. 501, 278–279, 809 ,270, 267, 229–241, 253–255, 204 & 208–222, 1990.

Foley, "Computer Graphics: Principles and Practice," 2d ed. (1990) pp. 237–283, 501 & 809.

Blinn, "A Trip Down the Graphics Pipeline: The Homogeneous Perspective Transform," *IEEE Computer Graphics and Applications*, 13(3):75–80 (May 1993).

Primary Examiner—James P. Trammell
Assistant Examiner—John Leonard Young
Attorney, Agent, or Firm—Conley, Rose & Tayon, P.C.

[57] ABSTRACT

An object's Z-buffered primitives are determined using a floating point Z=wF/W, where wF is the value the W coordinate achieves at the front clipping plane F. This representation produces Z-values ranging from 1 to ≈0 as W varies from W=wF to W→∞. Z-values for distances near the back clipping plane advantageously have leading zeros and are more amenable to floating point representation and exhibit less information loss. Primitive vertices are examined and the largest vertex floating point exponent is stored and associated with the entire primitive as that triangle's floating point Z exponent. The stored exponent is subtracted from all the vertices' exponents and the results converted to fixed point, which format advantageously typically has few or no leading zeroes. After normal fixed point set-up and scan conversion operations occur, each pixel's final Z fixed-point value is converted back to floating point, and the relevant stored exponent for the polygon is added back in before distance comparisons are made.

23 Claims, 5 Drawing Sheets

METHOD AND APPARATUS IMPLEMENTING HIGH RESOLUTION RENDITION OF Z-BUFFERED PRIMITIVES

FIELD OF THE INVENTION

The invention relates to displaying hidden surface removed three-dimensional imagery in general, and more specifically to methods and devices that compare Z distances to graphics primitives (and portions thereof), including so-called Z-buffered rendering techniques to more rapidly, accurately and realistically display three-dimensional graphics.

BACKGROUND OF THE INVENTION

Modern three-dimensional computer graphics use geometry extensively to describe three-dimensional objects, using a variety of graphical representation techniques. Computer graphics find especially wide use in applications such as computer assisted design ("CAD") programs. Complex smooth surfaces of objects to be displayed may be represented using high level abstractions. Detailed surface geometry may be rendered using texture maps, although providing more realism requires raw geometry, usually in the form of triangle primitives. In modern workstation computer systems, position, color (e.g., red, blue, green and optionally $\alpha$), and normal components of these triangles are typically represented as floating point numbers. The treatise *Computer Graphics: Principles and Practice* (2nd ed.), by Foley, van Dam et al. provides substantial detail as to three-dimensional graphics in general and should be consulted by those wishing further background information.

Figure 1:
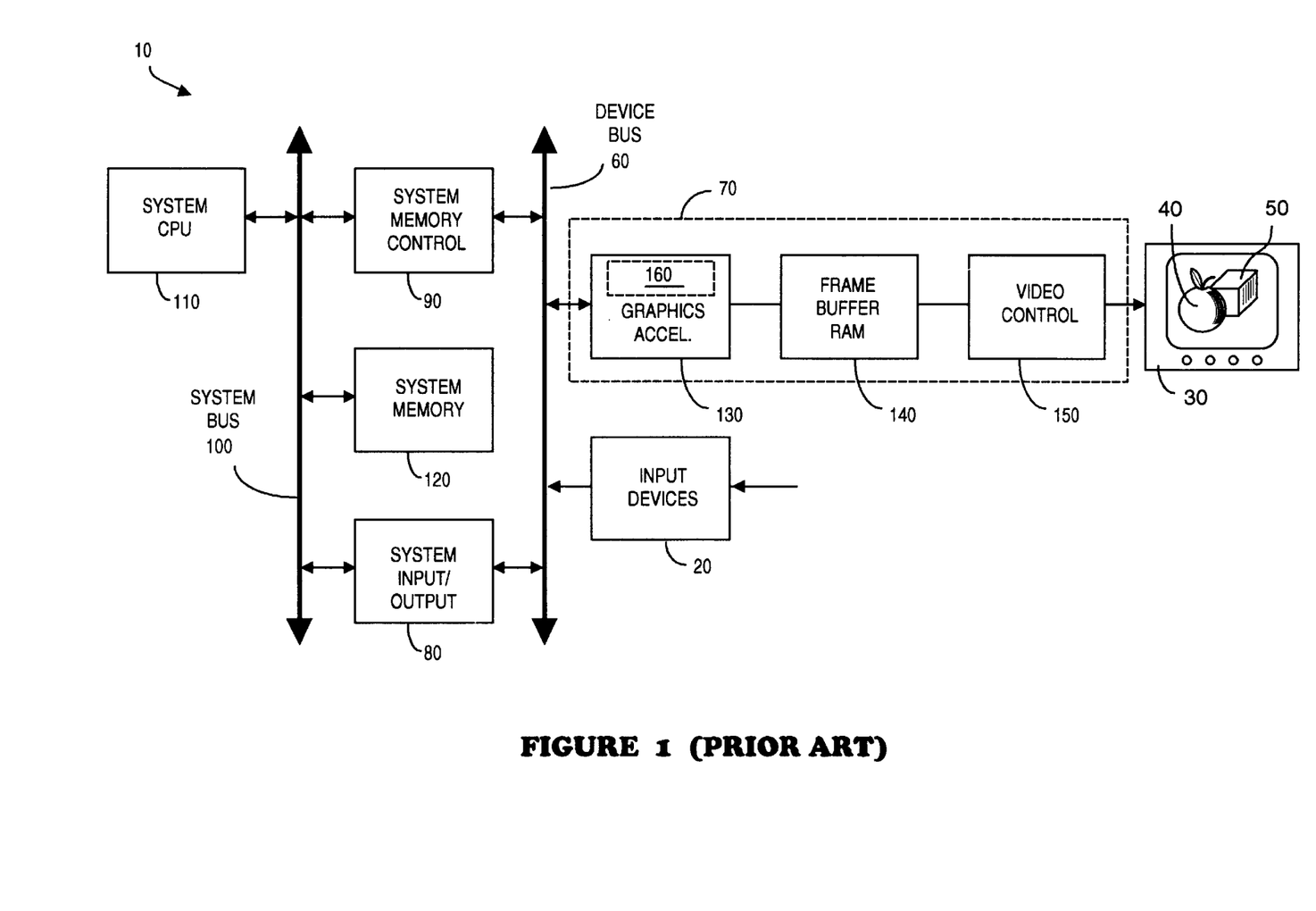
FIG. 1 depicts a three-dimensional graphics video system including fixed point Z-buffering, according to the prior art.

FIG. 1 depicts a prior art generic video system 10 such as may be used with a computer system to display user-generated images. Using a drawing program, for example, such images may be created with a mouse, trackball or other user input devices 20 for display on a video monitor 30, among other uses. Within the context of the invention to be described, displayed objects 40, 50 typically will have a three-dimensional surface, and commonly a portion of one object may be hidden by a portion of another object. In FIG. 1, for example, a portion of object 40 appears to be in front of a portion of object 50, thus hiding from view the concealed portion of object 50. The portion of object 50 that is hidden from view by another object is termed the hidden surface.

Input data from device 20 typically is coupled to a device bus 60, from where coupling to a video processing system 70 occurs, as well as coupling to as computer system input/output interface unit 80, and a computer system memory controller unit 90. Units 80 and 90 are typically coupled to a system bus 100 that also is coupled to the system central processor unit ("CPU") 110, and to the computer system persistent memory unit 120. Among other tasks, CPU 110 may be involved with processing triangular data representing the three dimensional surface of the object to be displayed on monitor 30.

CPU-processed video information is coupled via system bus 100, memory controller 90, device bus 60 into video system 70. Video system 70 typically includes a graphics accelerator unit 130, a video frame buffer random access memory ("3DRAM") unit 140 (or any other form of RAM video store) and a video control unit 150. Processed video from video system 70 is then coupled to monitor 30, which displays images such as images 40 and 50.

The realism of a computer-displayed image three-dimensional objects depends upon many factors, including rapidly calculating those portions of objects that are visible and those portions that are hidden (e.g., have hidden surfaces). Graphics accelerator unit 130 typically im/plements an algorithm to remove the hidden surface of each object to be displayed.

A so-called Z-buffer unit 160 associated with graphics accelerator unit 130 stores a "Z-value", e.g., a depth-value, for each pixel that is to be rendered and displayed. Pixel values for object 50, for example, should only be overwritten when object 50 is closer to a viewing position than the Z-value that is already stored for that pixel value. There exists an image plane onto which the objects to be viewed are projected, and the Z-buffer must ensure that objects that are far away from the view point are projected behind objects that are closer to the view point. Objects should appear smaller as their distance from the view point increases, and the pixel drawing relationship is represented by a function that is inversely proportional to distance. This concept is commonly what is meant by Z-buffering, and the Z-data may be referred to as Z-buffered primitives.

In practice, the old Z-value for the current pixel being rendered is read from the Z-buffer and is numerically compared with a newly generated Z-buffer value for the current pixel. Depending upon the outcome of the comparison, the old Z-values and color frame buffer pixel values will remain, or will be replaced by the newly calculated values.

After the transformation from model space to view clipping coordinates, the term W refers to a scaled distance along the z-axis from the viewpoint to the transformed point. The value Z refers to a similar scaled distance but one having its origin other than at the viewpoint, typically an origin at the front clipping plane, or a point between the front and back clipping planes. After the transformation from view clipping coordinates to screen coordinates, the value of Z is derived from the quantity Z/W. For orthographic projection, the value Z/W is linear in the distance to the point in world coordinates. For perspective projection, this Z/W value is linear in the reciprocal of the distance to the point.

Early three-dimensional computer graphics was most concerned with so-called "orthographic projections", in which objects would not diminish in size with increasing distance from the viewpoint (so-call ed "infinite parallel projection"). In orthographic projections, the value of Z used for eliminating hidden surfaces was linear in the distance to the point in world coordinates. In such application, numeric representation using either fixed point or floating point well matched the numeric values produced by the math.

But as three-dimensional computer graphics adopted "perspective projection", the underlying historically developed equations and numeric representations were not changed, even though such numerical representations were no longer well matched to the mathematics involved. To understand why, it is necessary to recall that in the perspective case, the calculated screen space Z value is linear in the reciprocal of world coordinate distance. The equations used in the prior art produced a screen space Z value related to the world space distance as follows:

$$Z=(1/(1-F/B))*(1-F/Z) \tag{1}$$

For large B/F ratios:

$$Z \approx 1-F/Z \tag{1'}$$

Figure 2A:
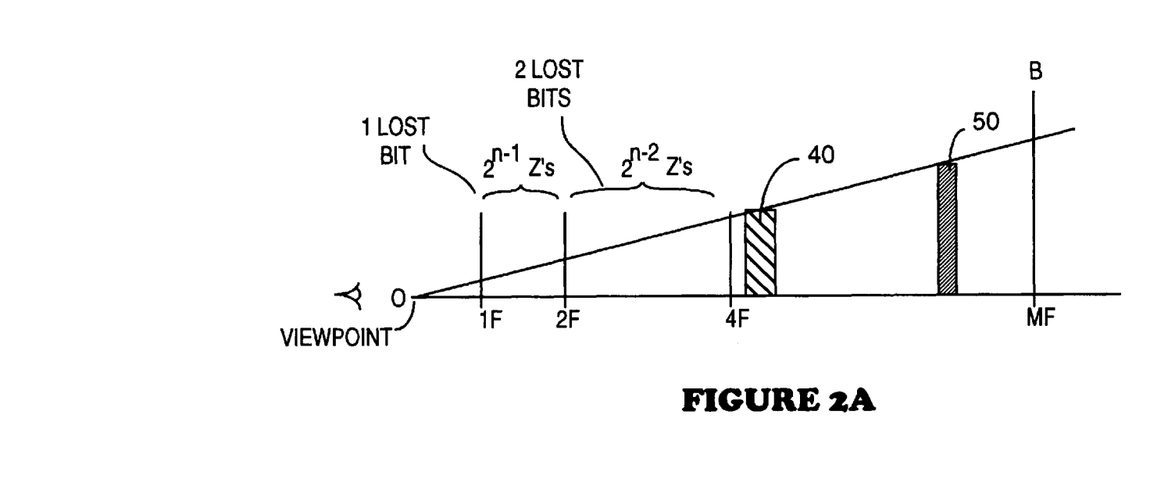
FIG. 2A depicts front and back viewing planes associated with a Z-to-W transformation.

B/F represents the ratio of distance in world coordinates from the viewpoint to the back clipping plane, to the distance from the viewpoint to the front clipping plane. FIG. 2A depicts the front and back clipping planes denoted as F and B respectively. At the left of FIG. 2A, the "0" represents the eye of the viewer observing the representations of the displayed objects, e.g., refers to the viewpoint. In FIG. 2A, 40 and 50 represent the relative position of two objects, perhaps objects similar to what was displayed on monitor 30 in FIG. 1.

The B/F ratio plays an important role in the relevant mathematical relationships. In the early days of perspective projection three-dimensional computer graphics, the B/F ratio was typically a small integer. Commonly, the front clipping plane would be two feet from the viewpoint, and the back clipping plane would be four to ten feet away. This configuration was sufficient to view three-dimensional objects having an apparent size of a few feet, suspended in a black background.

However, more modern and realistic large scale virtual environments may dictate that the front clipping plane is but a few inches from the viewer's nose, while the back clipping plane may be miles away. For this configuration, very large B/F ratios result. For example, a front clipping plane at six inches and a rear clipping plane at ten miles produces a B/F ratio exceeding 100,000. Even smaller ranges of six inches and six hundred feet can still produce ratios exceeding 1,000.

The standard screen space Z equation (1) is defined such that points near the front clipping plane F produce a Z value near zero, and points near the back clipping plane B produce a Z value near one (or, using a slightly different equation, −1 and 1, or 1 and −1).

In considering the numerical suitability of a particular equation, it is important to examine how values represented in the input are represented at the output. Consider the particular case of B/F=1,024. In screen space, using equation (1), any points located in the back half of this range (more than halfway toward the back clipping plane) will have ten leading one digits before any other distance-representing bits begin, e.g., a form .1111111111xxx . . . xxx. Thus in world coordinates, any points requiring n bits of accuracy to represent a value between B/2 and B, will require 10+n bits of accuracy for screen space representation, if equation (1) is used. In general, equation (1) requires approximately the ceiling($\log_2$(B/F)) additional bits for screen space representation. For example, a B/F ratio of 100,000 will require an additional 17 bits.

Note that the above representation loss affects both fixed point and floating point representations. While floating point representations are efficient at encoding values having leading zero bits, because the screen space Z value of points near the back clipping plane is mapped to one, the extra bits generated are leading one bits.

Although many three-dimensional graphics processors compute equation (1) using floating point representation, for reasons of cost, subsequent setup and scan conversion steps are almost always computed using fixed point representations.

Delay and inaccuracy in calculating proper Z-buffered primitives can result in an erroneous display of the relevant objects. For example, in FIG. 1, displayed objects 40 and/or 50 (among other objects now depicted for ease of illustration) may be moved about, perhaps rotated, changed in size, etc. Thus, realism dictates the necessity to rapidly provide Z-buffer data. Z-buffer data that is too inaccurately calculated can degrade the realism of the displayed image.

In FIG. 1, for example, the apple object 40 appears to be in front of, e.g., closer to the viewing position (and thus having smaller Z-buffer values) the box 50. However, the realism of the display would be destroyed if Z-buffer data for the hidden surface of the box were erroneously calculated say for only the bottom front edge of the box. The resultant display should show the apple in front of the box, except that the bottom front edge of the box would incongruously be in front of the apple.

Figure 2B:
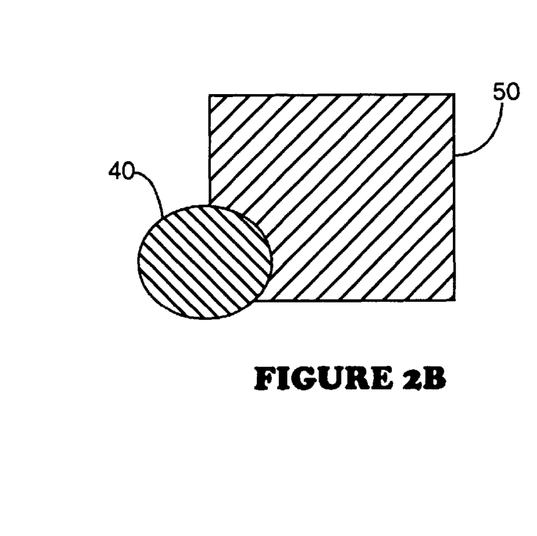
FIG. 2B depicts a projected view of images 40 and 50, with correct Z-buffering.
Figure 2C:
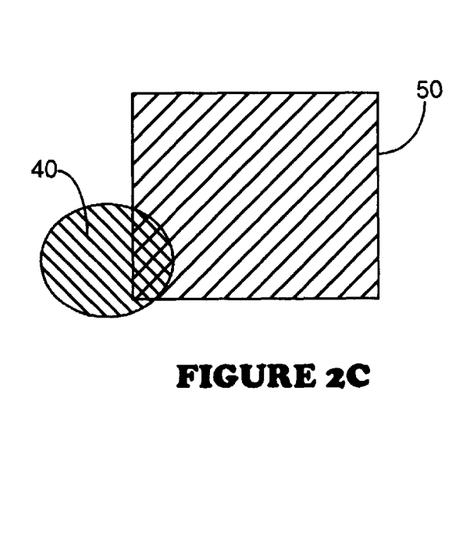
FIG. 2C depicts a projected view of images 40 and 50, with a first example of erroneous Z-buffering.
Figure 2D:
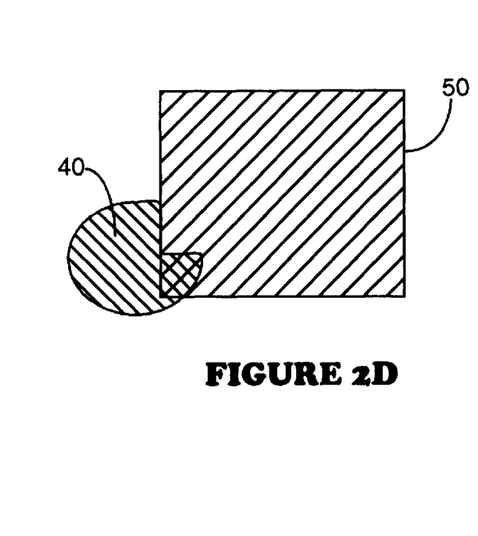
FIG. 2D depicts a projected view of images 40 and 50, with a second example of erroneous Z-buffering.

When Z-buffered data is properly calculated, images 40 and 50 will be displayed as shown in FIG. 1, wherein the apple 40 is in front of the box 50. FIG. 2B depicts the proper projected image representation for these two images. However, in a Z/F distance regime in which Z-buffered data becomes too inaccurate, errors can occur. Thus, in FIG. 2C, rather than over-write underlying pixel data for the concealed surface of box 50, prior art Z-buffer unit 160 has erroneously decided to simultaneously paint pixels for object 40 and for object 50. The result is an overlay region in which one or both of the objects may appear to be ragged overlaid, known as "Z-buffer fighting". FIG. 2D shows yet another type of display error resulting from incorrect Z-buffering, according to the prior art. In FIG. 2D a portion of box 50 erroneously appears solidly in front of a portion of apple 40, yet a portion of box 50 appears raggedly overlaid relative to apple 40, as well.

It is apparent that resolution loss problems when using fixed-point integer calculations of the type defined by the above equations are very dependent upon the B/F ratio. Assume that the ratio of B/F is M, that is the front plane is at distance F and the backplane is at distance MF. Consider now when the distance to the backplane is doubled, e.g., the backplane is now at distance 2MF. For each such distance doubling, another bit of resolution is lost, leaving potentially too few bits to resolve the remaining distances in the far half of the Z-buffer, e.g., between MF and 2MF. Assuming a Z-representation of n bits maximum, points at distance between 1F and 2F will be represented with n−1 bits of accuracy. Points between 2F and 4F will be represented with at most n−2 bits of accuracy, and so on. Thus the bits remaining may be insufficient to adequately resolve distances between obscuring objects, giving rise to incorrect calculation and display of hidden surfaces. It is now seen that for large B/F ratios, large numbers of bits of accuracy can be lost.

In summation, there is a need for a mechanism to accurately calculate Z-buffered values for displayed graphic objects, without imposing a non-linear loss of bits over different distant ranges. To better accommodate modern workstation computer systems, such Z-buffering preferably should implement an equation different than equation (1), and should use a floating point format. Preferably such Z-buffering should be capable of implementation using off-the-shelf generic components.

The present invention discloses such Z-buffering.

SUMMARY OF THE PRESENT INVENTION

The present invention recognizes that Z-buffering advantageously should be carried out in floating point format, to make better use of contemporary workstation computer systems and display systems. Rather than attempt to design a non-standard floating point representation to somehow efficiently encode leading one bits, the present invention implements the solution to a modification of equation (1). According to the present invention, a floating point formula that yields higher accuracy in quantizing Z-values is defined as follows:

$$Z = Wf/W \quad (2)$$

where wF is the value the W coordinate achieves at the front clipping plane F.

Equation (2) produces Z values that run from 1 to near zero as W varies from W=wF to W→∞, e.g., the sense of the Z-depth comparison is reversed. However, numerical value representations produced by equation (2) are very amenable to standard floating point encoding. Advantageously, numerical values near the back clipping plane will now have leading zeros and less information is lost. Further, such bit loss as does occur over the range $0<Z\leq1$ will occur in a more linear fashion than losses in the prior art.

The surface of a three-dimensional object to be displayed may be represented by a plurality of primitives (triangles, polygons, etc.) having vertices. In a preferred embodiment, all screen space Z values of a primitive are initially represented using full floating point representation. The present invention assumes that in all statistical likelihood, floating point representation of the screen space Z for each vertex in the associated primitive will typically share the same floating point exponent.

A comparative determination is made as to identify the primitive vertex having the largest floating point exponent, which exponent will be associated with the primitive. This largest exponent value is stored and is subtracted from all the vertices' exponents, and the results then converted to fixed point format. The fixed point vertices representation will typically have no (or few) leading zeros, which means most of the bits of the fixed point representation will encode useful information. Following normal fixed point set-up and scan conversion operations, each pixel's final Z fixed-point value is converted back to floating point, and the relevant stored exponent for the primitive is added back in before Z-buffer distance comparisons are made.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 3:
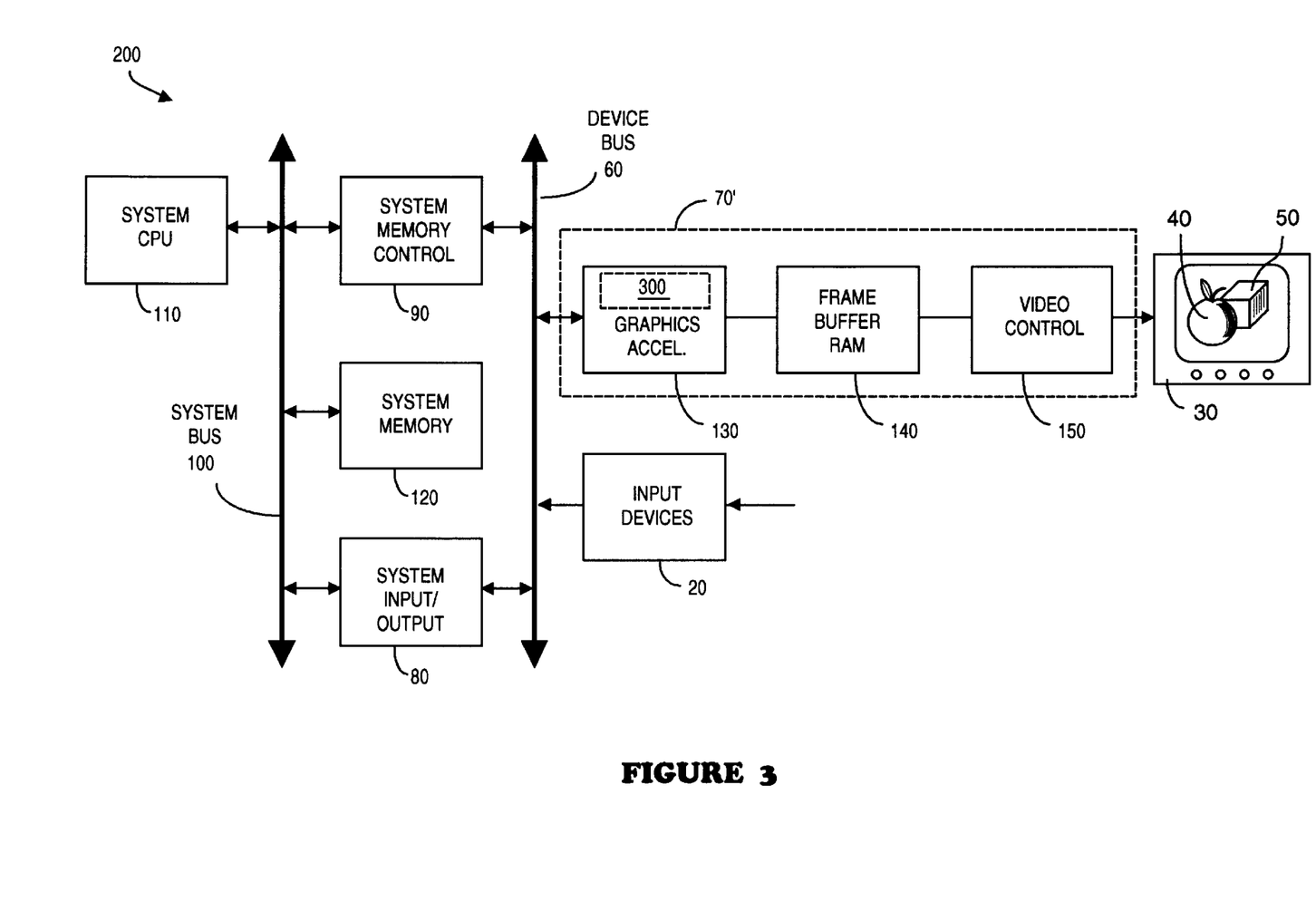
FIG. 3 depicts a three-dimensional graphics video system including floating point Z-buffering, according to the present invention.

FIG. 3 depicts a video system 200 such as may be used with a modern workstation or computer system to display user-generated images. Components in FIG. 3 bearing like reference numerals to what was shown and described with respect to FIG. 1 may be like components. In contrast to FIG. 1, however, video processing unit 70' in system 200 includes a floating point Z-buffer unit 300, according to the present invention. Z-buffer unit functions in floating point, a format that takes advantage of the floating point architecture present in much of system 200, and indeed modern workstation computer systems. Z-buffer unit 300 implements the following floating point formula to preserve high accuracy in quantizing Z-values for objects 40, 50 to be displayed on monitor 30:

$$Z = wF/W \qquad (2)$$

where wF is the value the W coordinate achieves at the front clipping plane F.

Note that equation (2) does not vary from 0 to 1 as an input point moves from the front clipping plane to the back clipping plane. Instead, equation (2) produces Z values that run from 1 to near zero as W varies from W=wF to W→∞. This result of course implies that Z-depth comparisons must now treat smaller values as farther away than larger values, e.g., the sense of the Z-depth comparison is reversed. However, numerical value representations produced by equation (2) are very amenable to standard floating point encoding. Advantageously, numerical values near the back clipping plane will now have leading zeros and less information is lost. Further, such bit loss as does occur over the range $0<Z\leq1$ will occur in a more linear fashion than losses in the prior art.

In addition to having the property of being very well suited to floating-point representation, equation (2) also has the property that all distances between 1F and 2F in front of the eyepoint share the same (maximum) exponent. In a preferred embodiment, 28-bits are used in which 4-bits represent exponent fields, and 24-bits represent the mantissa. Representations of the 1F to 2F distance regime can enjoy the full use of the 24-bits. Representation of distance points between 2F and 4F from the eyepoint will share the next exponent, and so on. Conventional Z-buffering systems employ an 8-bit exponent. However, the present invention functions well for most purposes using a 4-bit exponent, which makes an additional 4-bits available to achieve a 24-bit mantissa.

Preferably the present invention provides 24-bits of representation for every single region in the viewing plane, and even a single large primitive that spanned from distance 0 to infinity would still be represented by a total of 24-bits. But even in this worse case scenario, the present invention would nonetheless represent such object with a resolution no worse than what would be provided by prior art traditional mathematics. But in the best case, the present invention provides more accuracy than prior art Z-buffering techniques. As a result, the present invention can provide complete emulation and compatibility for the prior art methods, albeit implemented with new hardware.

Thus, values in the Z-buffer will represent distances in an exponentially increasing spacing similarly to floating-point representation of points for normal values. As such, the numerical representation accuracy of the Z-buffer values is well matched to the floating-point values produced when transforming points from model space to viewing space. Essentially, the initial numerical accuracy of the user's model space input points is preserved through processing and into the hardware Z-buffer.

Figure 4:
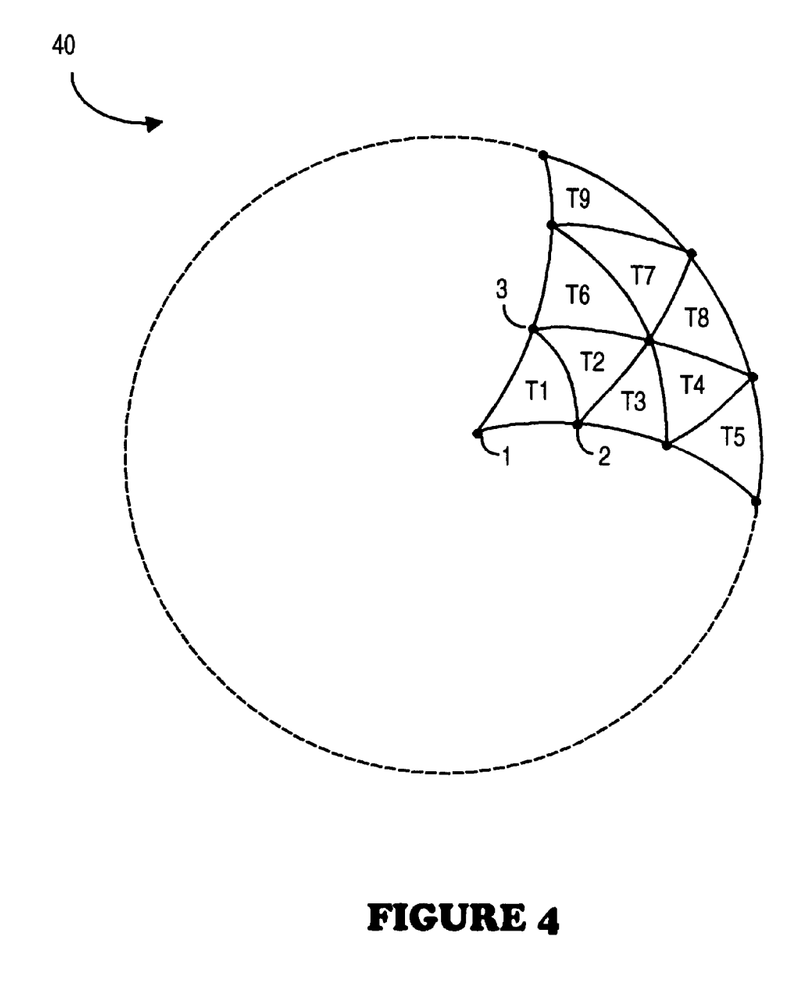
FIG. 4 depicts a surface portion of a displayed object as including a plurality of triangles, each defined by three vertices, according to the present invention.

As shown by FIG. 4, the surface of a three-dimensional object to be displayed may be represented by a plurality of primitives (triangles, polygons, etc.) having vertices. In the example shown, the surface of a three-dimensional object to be displayed, e.g., "apple" 40, is represented by a plurality of triangles, each having three vertices. Thus, triangle T1 may be defined by vertices (1,2,3), and so on.

Even in representations wherein the back clipping plane is quite distant, e.g., perhaps a mile, the individual geometric primitives to be drawn will most likely be substantially smaller than such distance. Generally, individual vertices of a given polygon, triangle or other primitive forming a part of a given object will be very close together relative to the entire Z range. This implies that in all statistical likelihood, Z-buffer distances to the vertices, e.g., floating point representation of the screen space Z for each vertex, will typically share the same floating point exponent. Even if exponent values do differ, they will differ by only a small amount.

Thus, with respect to the example of FIG. 4, the three vertices for an individual triangle will likely still have floating point exponents that are approximately the same. This common exponent information is used to represent the Z-distance, according to the present invention. Z-buffer unit 300 associates that largest exponent with the entire triangle (an association "tag" is made, for example in a data header) as that triangle's floating point Z exponent value. Thus, if vertex 3 associated with triangle T1 had a larger exponent value than either vertex 1 or vertex 2, the common floating point Z-exponent value for triangle T1 would be the value of vertex 3. The values of the remaining vertices, 2 and 3, would be examined but only the mantissa or fractional field bits, e.g., the remainder of the bits, are used.

Figure 5:
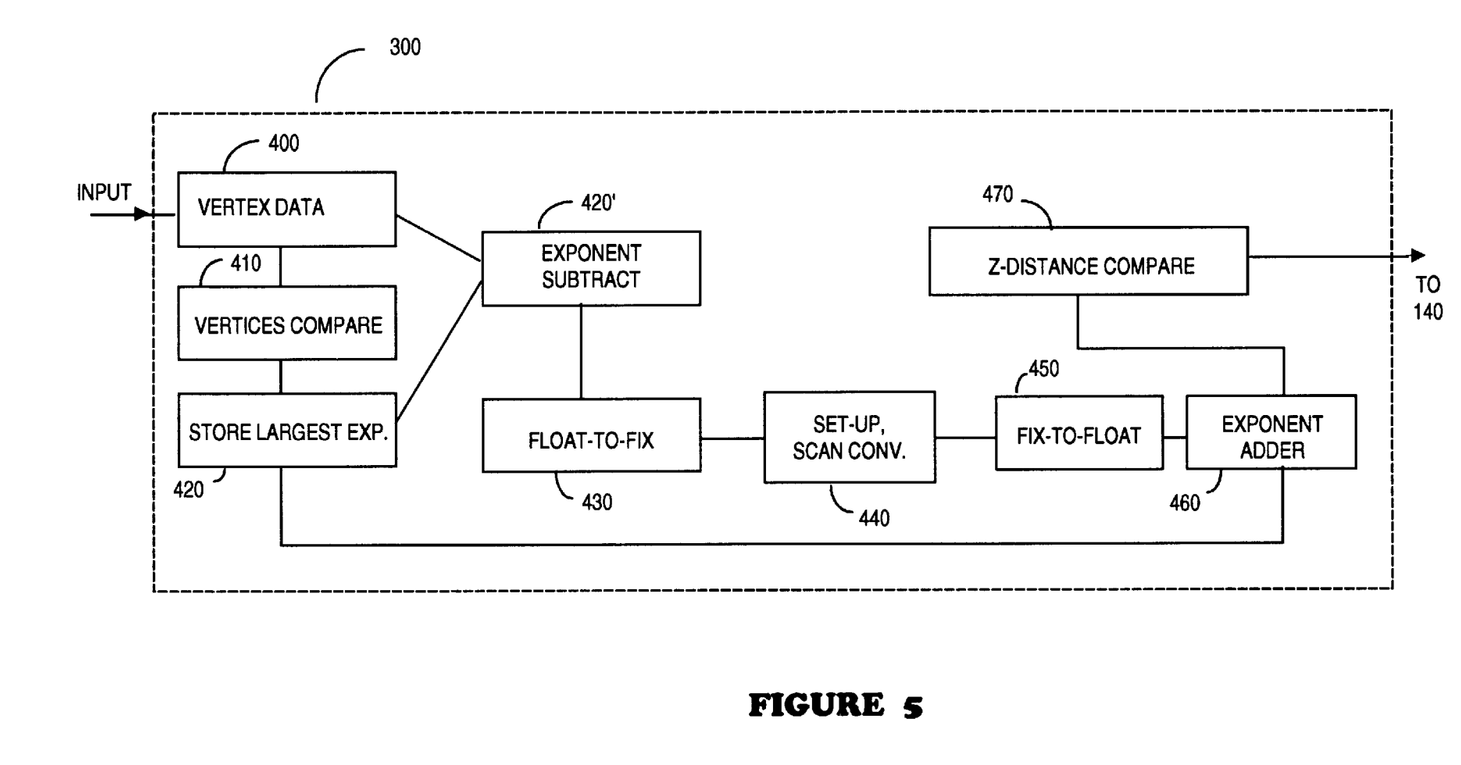
FIG. 5 depicts a preferred implementation of the present invention.

FIG. 5 is a block diagram of a preferred embodiment, unit 300. Preferably, all screen space Z values of a primitive are initially represented using full floating point representation. This floating point vertex data is available to unit 400, a buffer, for example. Next, a determination is made as to which vertex has the largest floating point exponent, a step carried out by a vertex comparitor 410. Such comparison may be carried out in a number of ways, including bit shifting.

This largest exponent value is stored in a memory unit 420. An exponent subtractor unit 420' then subtracts this stored value from each of the vertices' exponents associated with that primitive. A floating point to fixed point converter unit 430 then changes the format of the subtraction results.

The data has now been converted to fixed point format, and the fixed point vertices representation will advantageously typically have no (or few) leading zeros. In contrast to the prior art, this representation allows most of the bits of the fixed point representation to encode useful information.

Unit 440 represents conventional fixed point set-up and scan conversion operations, after which each pixel's final Z fixed-point value is converted back to floating point, using a format converter 450. The relevant exponent that was stored in memory 420 for the primitive is now added, using exponent adder 460, back in to the data. At sub-unit 470, Z-distance comparisons are made among normalized values having tagged exponents. The comparison (which may be made on an integer basis) may occur within three-dimensional RAM.

Preferably unit 450 carries out a specialized fixed point to (normalized) floating point conversion before the interface to the frame buffer memory system implements at least final processing steps.

Normalization of Z-buffer pixel values can be carried in a number of ways. For example, the Z-interpolated fixed point number representing the primitive is examined for leading zeroes until the first "1" bit in the value is found. The number of bit positions to that first "1" may be used as an offset that is subtracted from the shared exponent of the pixel's associated triangle (or other) primitive. The Z-buffer pixel value may then be barrel shifted to bring the first "1" bit to a hidden bit location. The offset may then be subtracted from the shared exponent, to form the individual exponent for this particular Z-buffer pixel value. If this subtraction produces a negative result, the individual exponent will be the zero (or de-normalized) exponent, and the amount of barrel shifting will be correspondingly reduced.

If the floating point values are properly normalized (except for the minimum exponent de-normalized case), comparisons between such floating point Z values may be performed with an integer compare. So doing would eliminate a need for further complex floating point comparison logic. This feature is especially useful for implementation in which the Z comparator may be located in another integrated circuit chip, e.g., a 3DRAM unit, and not easily modified to use a non-integer comparison. In a preferred embodiment, unit 300 would be implemented as a single integrated circuit.

Video system 70' can still process the graphics data in the sense of generating graphics setups, incremental drawings, and the like. However, according to the present invention, a given primitive is simply a fixed point primitive, and for example it is not necessary to pad a floating point value to obtain different pixel Z-values. However, at the end of the Z-buffering process, prior to inserting a Z-value from an individual primitive into the frame buffer, it is necessary to know from the data (e.g., from a header tag) that the exponent represents the entire primitive, and not merely a single vertex thereof.

Although the present invention has been described with respect to Z-buffering three-dimensional graphics representations, the described methodology may also be applied to non-graphical applications requiring similar remappings as well.

Modifications and variations may be made to the disclosed embodiments without departing from the subject and spirit of the invention as defined by the following claims.

What is claimed is:

1. A method for rendering three-dimensional graphics data, the method comprising:

receiving a set of three-dimensional graphics data representing a plurality of primitives, wherein each primitive comprises one or more vertices;

translating said one or more vertices to view clipping coordinates based on a selected viewpoint, wherein said translating includes generating Z-values for the one or more vertices, wherein the Z-values vary from one at a front clipping plane to near zero at a back clipping plane; and scan converting the primitives into pixels, wherein said pixels are displayable to form an image, wherein said translating is accomplished by applying a formula substantially equivalent to $Z=Wf/w$, wherein Z is the Z-value being calculated, wherein w is a scaled distance along a z-axis from the selected viewpoint to the vertex being transformed, and wherein Wf is a value of w at the front clipping plane.

2. The method as recited in claim 1, wherein each primitive comprises two or more vertices, wherein the Z-values are generated in floating point format, and wherein said method further comprises:

comparing the Z-values of said two or more vertices to determine which of the Z-values has the largest exponent value; and storing the largest exponent value.

3. The method as recited in claim 2, further comprising subtracting the largest exponent value from each of the Z-values;

converting the resulting Z-values to fixed-point format; and performing scan line conversion on the fixed-point Z-values to generate pixels having fixed-point Z-values.

4. The method as recited in claim 3, further comprising converting the fixed point pixel Z-values to floating point format;

adding the corresponding stored floating point exponents to the floating point pixel Z-values; and storing the floating point pixel Z-values in a frame buffer.

5. The method as recited in claim 4, wherein said storing is performed only in response to a successful Z-distance comparison that compares the floating point pixel Z-values to be stored in the frame buffer with the floating point pixel Z-values already in the frame buffer.

6. The method as recited in claim 5, further comprising normalizing the floating point pixel Z-values.

7. The method as recited in claim 2, further comprising associating the stored exponent with the corresponding primitive.

8. The method as recited in claim 1, wherein said associating includes providing at least one or a (i) special header, and (ii) a tag in data representing values of said primitive.

9. A graphics system configured to render three-dimensional graphics data, the graphics system comprising:

a graphics accelerator configured to receive the three-dimensional graphics data and generate a corresponding plurality of pixels that are displayable to form an image, wherein the three-dimensional graphics data represents a plurality of primitives, wherein each primitive comprises one or more vertices, and wherein the graphics accelerator is configured to translate the vertices to view clipping coordinates based on a selected viewpoint by generating Z-values for the one or more vertices, wherein the Z-values vary from one at a front clipping plane to near zero at a back clipping plane;

a frame buffer configured to receive and store pixels from the graphics processor; and a video control unit configured to read the contents of the frame buffer and output them to a display device, wherein said graphics accelerator is configured to translate the vertices by applying a formula substantially equivalent to Z=Wf/w, wherein Z is the Z-value being calculated, wherein w is a scaled distance along a z-axis from the selected viewpoint to the vertex being transformed, and wherein Wf is a value of w at the front clipping plane.

10. The graphics system as recited in claim 9, wherein each primitive comprises two or more vertices, wherein the Z-values are generated in floating point format, and wherein the graphics accelerator is further configured to compare the Z-values of said two or more vertices to determine which of the Z-values has the largest exponent value; and wherein the graphics accelerator is configured with a plurality of storage locations configured to the largest exponent values for a plurality of the primitives being rendered.

11. The graphics system as recited in claim 10, wherein the graphics accelerator is further configured to:

subtract the largest exponent value from each of the Z-values;

convert the resulting Z-values to fixed-point format; and perform scan line conversion on the fixed-point Z-values to generate pixels having fixed-point Z-values.

12. The graphics system as recited in claim 11, wherein the graphics accelerator is further configured to:

convert the fixed point pixel Z-values to floating point format;

add the corresponding stored floating point exponents to the floating point pixel Z-values; and store the floating point pixel Z-values in a frame buffer.

13. The graphics system as recited in claim 12, wherein the frame buffer is configured to store only the floating point pixels with Z-values that indicate positions that are closer to the selected viewpoint than any pixels already stored in the frame buffer at corresponding locations.

14. A method for rendering three-dimensional graphics data, the method comprising:

receiving a set of three-dimensional graphics data representing a plurality of primitives, wherein each primitive comprises two or more vertices;

translating said two or more vertices to view clipping coordinates based on a selected viewpoint, wherein said translating includes generating floating point Z-values for each vertex;

comparing the Z-values of said two or more vertices to determine which of the Z-values has the largest exponent value;

subtracting the largest exponent value from each of the Z-values;

converting the resulting Z-values to fixed-point format;

performing scan line conversion on the fixed-point Z-values to generate pixels having fixed-point Z-values, wherein the pixels are displayable to form an image;

converting the fixed point pixel Z-values to floating point format;

adding the corresponding largest exponent to the floating point pixel Z-values; and storing the pixels and the floating point pixel Z-values in a frame buffer, wherein said translating is accomplished by applying a formula substantially equivalent to Z=Wf/w, wherein Z is the Z-value being calculated, wherein w is a scaled distance along a z-axis from the selected viewpoint to the vertex being transformed, and wherein Wf is a value of w at the front clipping plane.

15. The method as recited in claim 14, wherein said translating includes generating Z-values for the one or more vertices, wherein the Z-values vary from one at a front clipping plane to near zero at a back clipping plane.

16. The method as recited in claim 14, further comprising storing the largest exponent for each primitive that is being processed by the graphics accelerator, wherein the largest exponent for each primitive is assigned a tag associated with the corresponding primitive.

17. The method as recited in claim 14, further comprising normalizing the floating point pixel Z-values.

18. A graphics accelerator configured to render three-dimensional graphics data, the graphics system comprising:

a means for receiving the three-dimensional graphics data;

a graphics processor configured to generate a plurality of pixels corresponding to the three-dimensional graphics data, wherein the three-dimensional graphics data represents a plurality of primitives, wherein each primitive comprises one or more vertices, and wherein the graphics processor is configured to translate the vertices to view clipping coordinates based on a selected viewpoint by generating Z-values for the one or more vertices, wherein the Z-values vary from one at a front clipping plane to near zero at a back clipping plane, wherein said graphics accelerator is configured to translate the vertices by applying a formula substantially equivalent to $Z=Wf/w$, wherein $Z$ is the Z-value being calculated, wherein w is a scaled distance along a z-axis from the selected viewpoint to the vertex being transformed, and wherein Wf is a value of w at the front clipping plane; and a means for outputting the pixels to a frame buffer for storage and eventual display as an image.

19. The graphics accelerator as recited in claim 18, further comprising: a means for translating at least part of each vertex's position information into fixed point format in preparation for performing scan line conversion to generate the plurality of pixels.

20. The graphics accelerator as recited in claim 19, further comprising:

a means for translating each pixel's Z value from fixed point format into floating point format before outputting the pixels to the frame buffer.

21. The graphics accelerator as recited in claim 19, further comprising:

a means for translating each pixel's Z value from fixed point format into floating point format.

22. The graphics accelerator as recited in claim 21, further comprising:

a means for normalizing the floating point format of each pixel's Z value before outputting the pixel to the frame buffer.

23. A method for rendering graphics data in a graphics system, the method comprising:

receiving three-dimensional graphics data representing objects to be displayed by the computer graphics system, wherein the graphics data comprises one or more graphics primitives, wherein each graphics primitives comprises one or more vertices, wherein each vertex includes a floating point Z-value;

comparing the exponents of the floating point Z-values for a particular geometric primitive;

storing the largest exponent;

subtracting the largest exponent from the Z-values for the particular geometric primitive;

translating the Z-values for the particular geometric primitive into fixed-point format using the formula $Z=Wf/w$, wherein Wf is the value of a w-coordinate at a front clipping plane F;

performing set-up calculations on the particular geometric primitive using the fixed-point format Z-values to generate fixed-point results;

converting the fixed-point results of the set-up calculations into converted floating point Z-values;

performing Z comparisons using the converted floating point Z-values;

rendering the geometric primitive into a frame buffer in response to a winning Z comparison; and displaying the contents of the frame buffer on a display device to form an image.

\* \* \* \* \*